United States Patent
Dratewski

(10) Patent No.: US 8,246,268 B1
(45) Date of Patent: Aug. 21, 2012

(54) CONNECTOR FOR CONNECTING A BICYCLE TO A BICYCLE CARRIER AND METHOD OF USE

(76) Inventor: George Jerzy Dratewski, Wheeling, IL (US)

( * ) Notice: Subject to any disclaimer, the term of this patent is extended or adjusted under 35 U.S.C. 154(b) by 114 days.

(21) Appl. No.: 12/800,084

(22) Filed: May 8, 2010

Related U.S. Application Data

(60) Provisional application No. 61/216,283, filed on May 16, 2009.

(51) Int. Cl.
*B60P 7/00* (2006.01)
(52) U.S. Cl. .................................................... 403/227
(58) Field of Classification Search ............... 410/3, 10, 410/23, 97; 403/64, 179, 225, 227; 224/563, 224/568, 924; 24/135 N
See application file for complete search history.

(56) References Cited

U.S. PATENT DOCUMENTS

| | | | |
|---|---|---|---|
| 6,551,008 B1 * | 4/2003 | Uchiyama | 403/353 |
| 6,805,522 B2 * | 10/2004 | Condon | 410/3 |
| 7,469,808 B2 * | 12/2008 | Morales et al. | 224/555 |

* cited by examiner

*Primary Examiner* — Stephen Gordon
(74) *Attorney, Agent, or Firm* — Ted Masters

(57) ABSTRACT

A connector for connecting a bicycle having a frame member to a bicycle carrier includes a frame rest which is shaped and dimensioned to receive the frame member of the bicycle. A line is wrapped around the frame rest and the frame member of the bicycle. A coupler connects to the frame rest, wherein during the connection the coupler urges the line toward the frame member of the bicycle thereby tightening the line around the frame rest and the frame member of the bicycle.

4 Claims, 8 Drawing Sheets

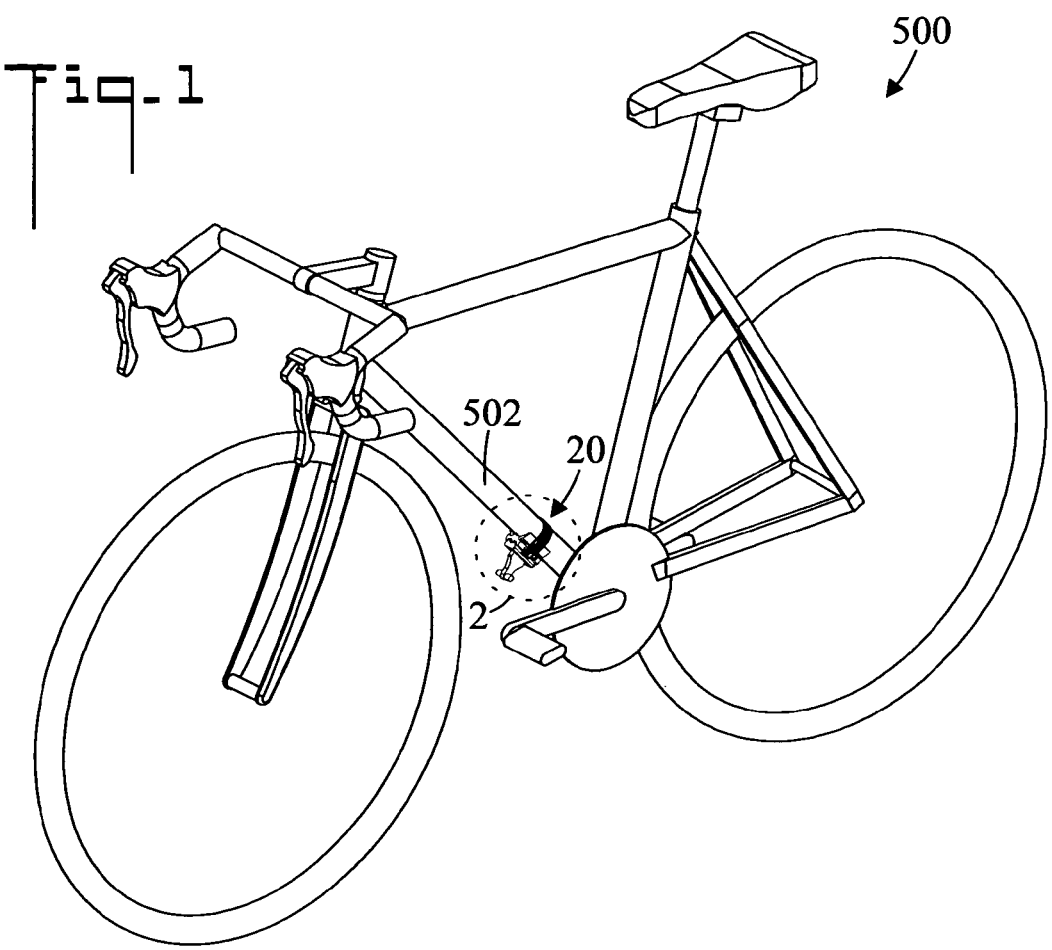
Fig_1
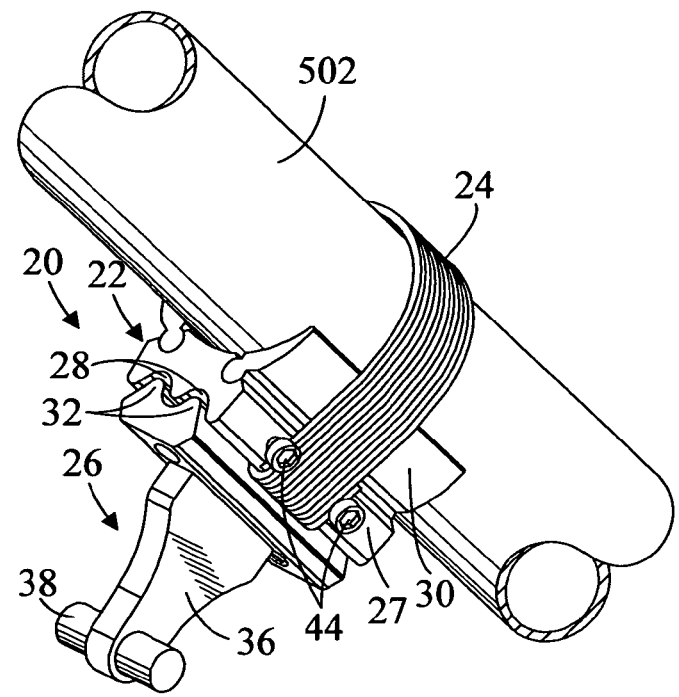
Fig_2

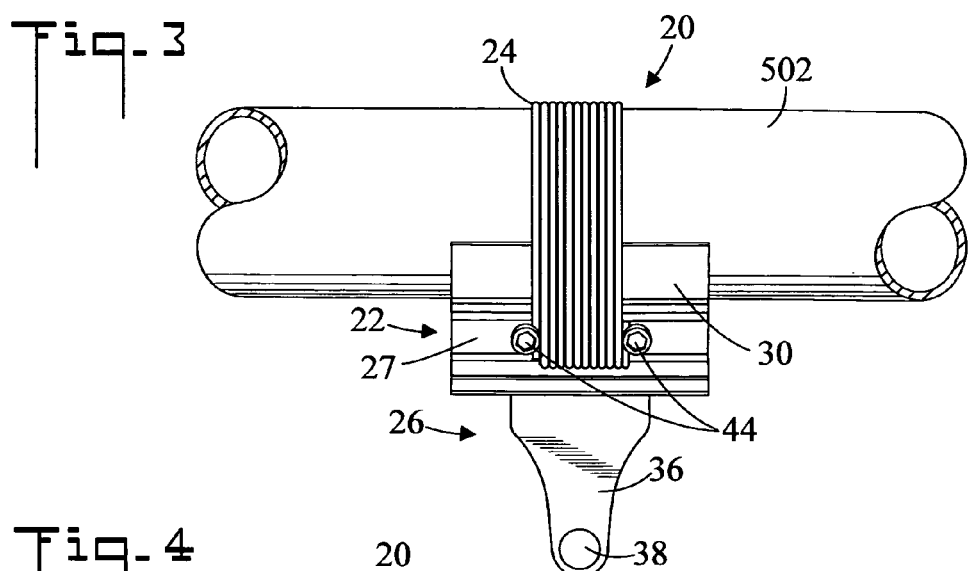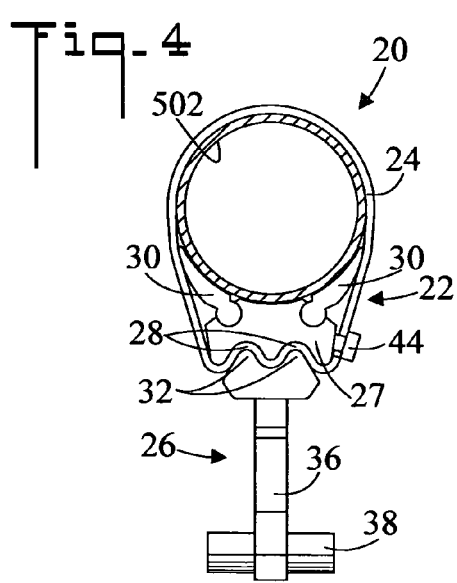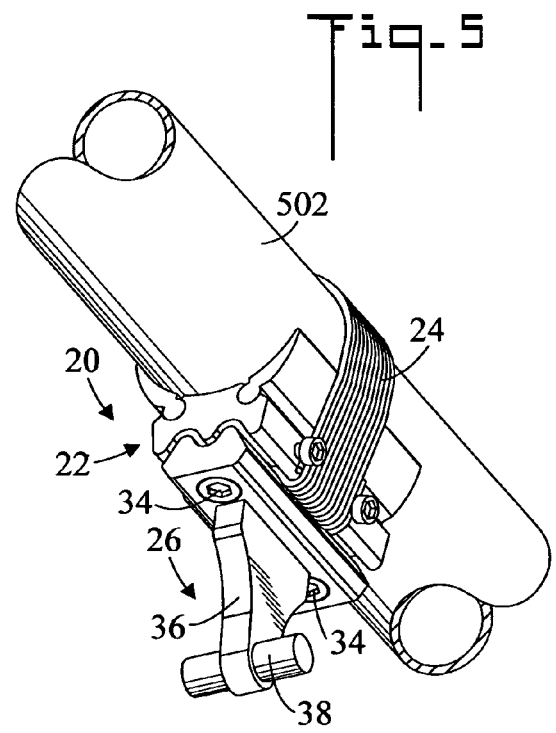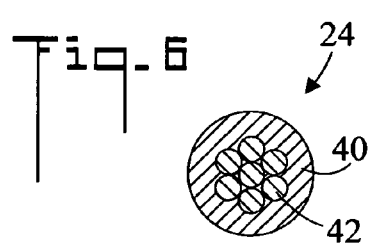

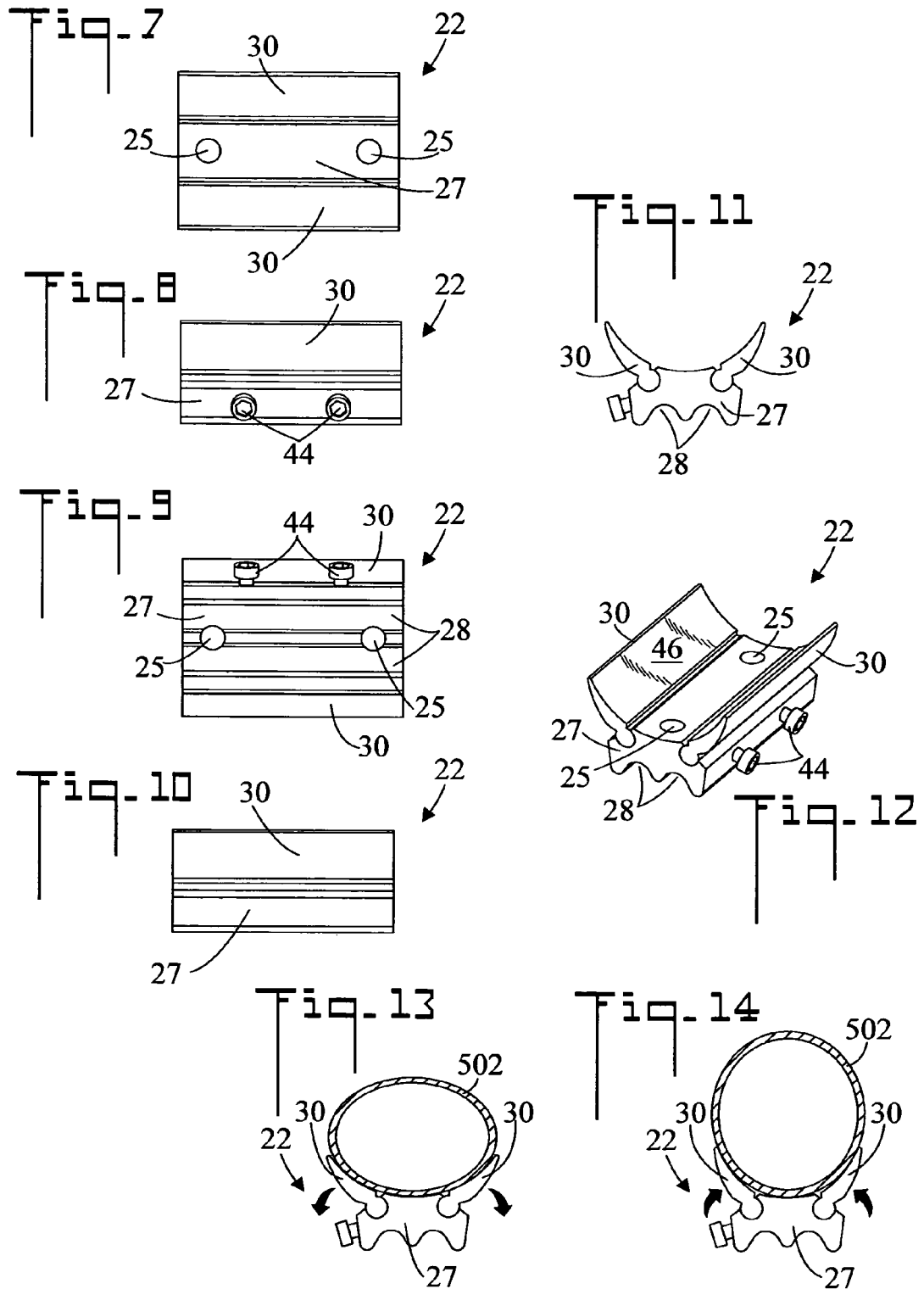

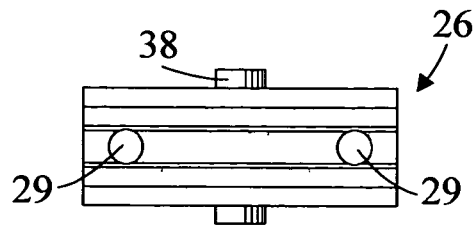
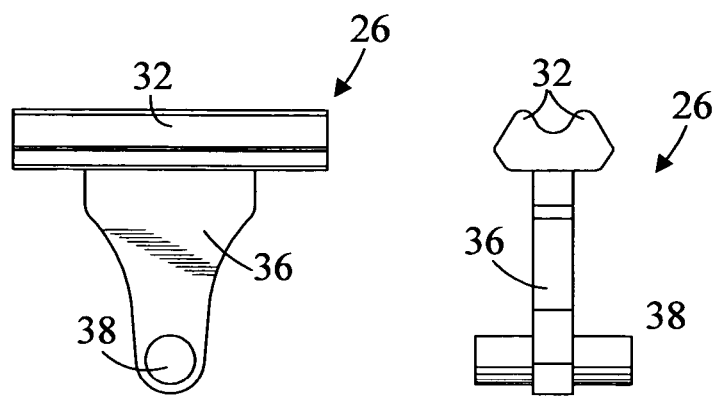
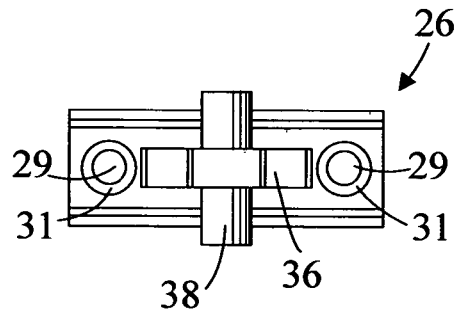
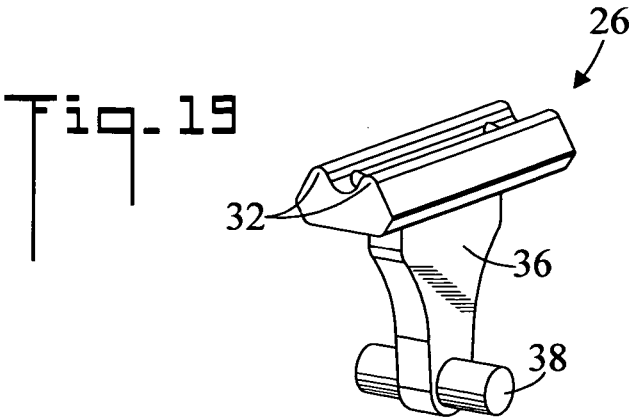

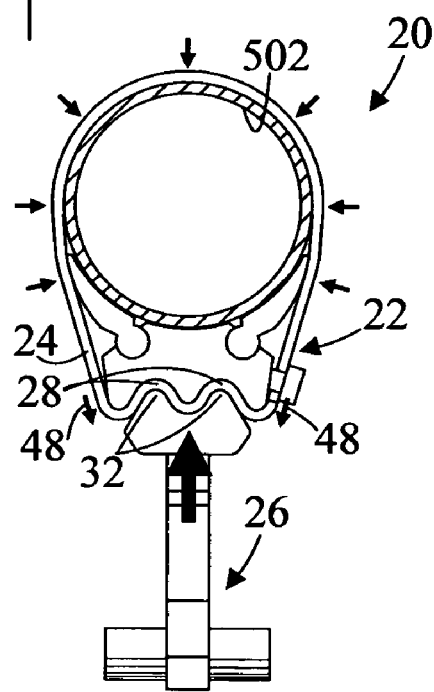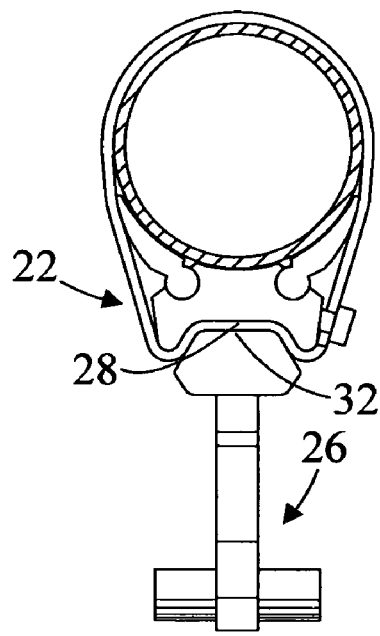

CONNECTOR FOR CONNECTING A BICYCLE TO A BICYCLE CARRIER AND METHOD OF USE

CROSS REFERENCE TO RELATED APPLICATION

This application claims the filing benefit under 35 U.S.C. §119(e) of U.S. Provisional Application No. 61/216,283 filed May 16, 2009, which is hereby incorporated by reference.

TECHNICAL FIELD

The present invention pertains generally to bicycles, and more particularly to a connector for connecting a bicycle to a bicycle carrier.

BACKGROUND OF THE INVENTION

A bicycle carrier (also commonly called a bike rack) is a device which attaches to a motor vehicle (such as an automobile, truck, SUV, RV, bus, etc.) for the purpose of transporting a bicycle. Bicycle carriers are typically mounted to the roof, front, or rear of the motor vehicle. The bicycles is usually clamped to the bicycle carrier.

BRIEF SUMMARY OF THE INVENTION

The present invention is directed to a connector for connecting a bicycle to a bicycle carrier. The connector is removably attached to the frame of the bicycle, and has a coupler which removably engages the bicycle carrier. The connector can be installed and permanently left on the bicycle frame, or alternatively can be installed for use and then removed.

In accordance with an embodiment, a connector for connecting a bicycle having a frame member to a bicycle carrier includes a frame rest which is shaped and dimensioned to receive the frame member of the bicycle. The connector further includes a line which is wrapped at least once around the frame rest and the frame member of the bicycle. A coupler connects to the frame rest, wherein during the connection the coupler urges the line toward the frame member of the bicycle thereby tightening the line around the frame rest and the frame member of the bicycle.

In accordance with another embodiment, the frame rest has at least one groove. When the line is wrapped around the frame rest and the frame member, the line extends across the at least one groove. The coupler has at least one ridge, wherein each at least one ridge is shaped and dimensioned to be received by a corresponding at least one groove, so that when the coupler is connected to the frame rest the at least one ridge urges the line into the at least one groove.

In accordance with another embodiment, the frame rest has two grooves, and the coupler has two ridges which are received by the two grooves.

In accordance with another embodiment, the frame rest has a body and two frame member receivers which receive the frame member of the bicycle. The two frame member receivers have a curved surface for receiving the frame member of the bicycle. The two frame member receivers are pivotally connected to the body of the frame rest.

In accordance with another embodiment, the line has a length such that it can be wrapped a plurality of times around the frame rest and the frame member.

In accordance with another embodiment, the line has a soft cover which will not mare the frame member of the bicycle.

In accordance with another embodiment, the coupler has at least one ridge. The coupler also includes an arm which outwardly projects away from the at least one ridge, the arm having a distal end. A locking pin is disposed at the distal end of the arm, the locking pin perpendicularly projecting outwardly in opposite directions from the arm. The locking pin is used to connect the connector to the bicycle carrier.

In accordance with another embodiment, the frame member of the bicycle is the downtube, and the frame rest is shaped and dimensioned to receive the downtube of the bicycle.

In accordance with another embodiment, the arm and locking pin are directly and permanently connected to the bicycle without the need for the frame rest and line.

Other possible embodiments, in addition to the possible embodiments enumerated above, will become apparent from the following detailed description, taken in conjunction with the accompanying drawings, which illustrate, by way of example, the principles of the connector and method of use.

BRIEF DESCRIPTION OF THE DRAWINGS

FIG. 1 is a reduced perspective view of a bicycle having a frame member, and a connector in accordance with the present invention;

FIG. 2 is an enlarged perspective view of area 2 of FIG. 1;

FIG. 3 is a side elevation view of the connector connected to the frame member of the bicycle;

FIG. 4 is an end elevation view of the connector and frame member;

FIG. 5 is a different perspective view of the connector and frame member;

FIG. 6 is an enlarged cross sectional view of a line;

FIG. 7 is a top plan view of a frame rest;

FIG. 8 is a side elevation view of the frame rest;

FIG. 9 is a bottom plan view of the frame rest;

FIG. 10 is an opposite side elevation view of the frame rest;

FIG. 11 is an end elevation view of the frame rest;

FIG. 12 is a perspective view of the frame rest;

FIG. 13 is an end elevation view of the frame rest receiving a different shaped frame member;

FIG. 14 is an end elevation view of the frame rest receiving another different shaped frame member;

FIG. 15 is a top plan view of a coupler;

FIG. 16 is a side elevation view of the coupler;

FIG. 17 is a bottom plan view of the coupler;

FIG. 18 is an end elevation view of the coupler;

FIG. 19 is a perspective view of the coupler;

FIG. 23 is an end elevation view of the connector connected to the frame member;

FIG. 24 is an end elevation view of another embodiment of the frame rest and the coupler;

DETAILED DESCRIPTION OF THE INVENTION

Figure 20:
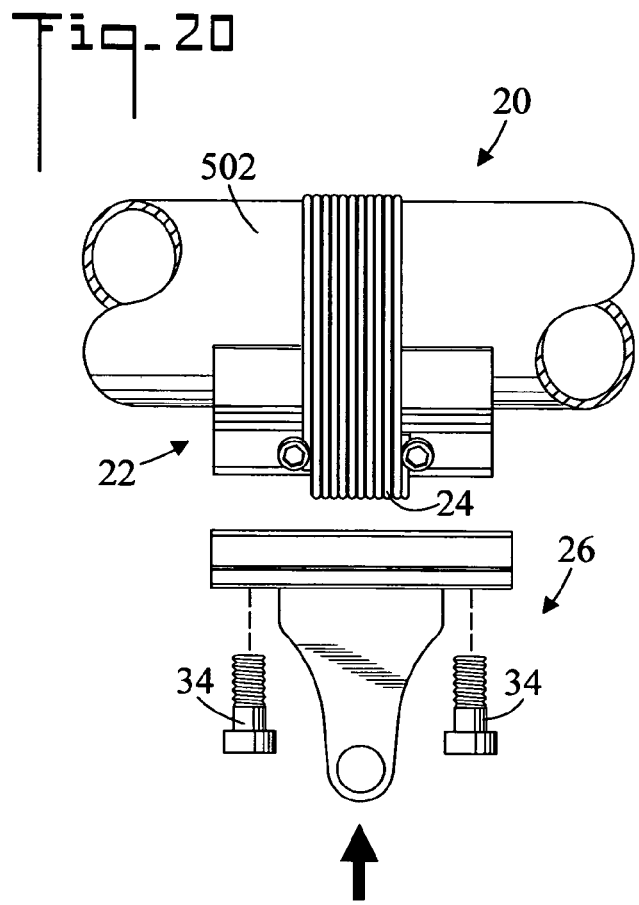
FIG. 20 is a side elevation view of the connector being connected to the frame member.

Referring initially to FIG. 1, there is illustrated a reduced perspective view of a bicycle 500 having a frame member 502, and a connector in accordance with the present invention for connecting frame member 502 of bicycle 500 to a bicycle carrier 600 (refer to FIGS. 25 and 26), the connector generally designated as 20. FIGS. 2-5 are perspective, side elevation, end elevation, and different perspective views respectively of connector connected to frame member 502. Connector 20 includes a frame rest 22 (also refer to FIGS. 7-12) which is shaped and dimensioned to receive frame member 502 of bicycle 500. Connector 20 further includes a line 24 which can be wrapped at least once around frame rest 22 and frame member 502 of bicycle 500. Connector 20 further includes a coupler 26 (refer to FIGS. 15-19). Coupler is used to connect connector 20 and attached bicycle 500 to bicycle carrier 600 (refer to FIGS. 25 and 26) Coupler 26 connects to frame rest 22, wherein during the connection coupler 26 urges line 24 toward frame member 502 of bicycle 500 thereby tightening line 24 around frame rest 22 and frame member 502 of bicycle 500 (refer also to FIG. 23 and the associated discussions). It is noted that in the shown embodiment, frame member 502 is the downtube of bicycle 500, and frame rest 22 is shaped and dimensioned to receive the downtube of bicycle 500.

Frame rest 22 closely receives frame member 502, and can adapt to frame members 502 having different shapes and sizes (refer to FIGS. 12 and 13 and the associated discussions). Also referring to FIGS. 7-12, frame rest 22 has a body 27 which has at least one groove 28. It is noted that in the shown embodiment of FIGS. 2, 4, 5, and 7-12, frame rest 22 has two grooves 28. FIG. 24 shows an embodiment in which frame rest 22 has one groove 28. When line 24 is wrapped around frame rest 22 and frame member 502, line 24 extends across at least one groove 28 and covers a portion of at least one groove 28 (refer to FIGS. 20-22). It is noted that in the shown embodiment of FIGS. 2-5, line 24 has a length such that it can be wrapped a plurality of times around frame rest 22 and frame member 502. Frame rest 22 also has two frame member receivers 30 which receive frame member 502 of bicycle 500. Frame member receivers 30 are pivotally connected to body 27 (refer to FIGS. 12 and 13 and the associated discussions).

Figure 21:
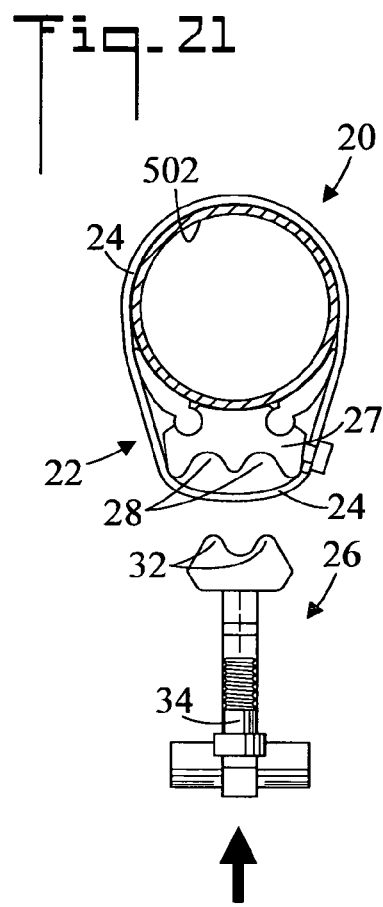
FIG. 21 is an end elevation view of the connector being connected to the frame member.

Referring also to FIGS. 15-19, coupler 26 has at least one ridge 32, wherein each at least one ridge 32 is shaped and dimensioned to be received by a corresponding at least one groove 28 of frame rest 22, so that when coupler 26 is connected to frame rest 22 the at least one ridge 32 urges line 24 into the at least one groove 28. That is, there are an equal number of grooves 28 in frame rest 22 and cooperating ridges 32 in coupler 26. In the shown embodiment of FIGS. 2, 4, 5, 7-12, and 15 through 19, frame rest 22 has two grooves, 28 and coupler 32 has two ridges 32 which are received by the two grooves 28. In an embodiment shown in FIG. 24, frame rest 22 has one groove 28 and coupler 26 has one ridge 32. As is depicted in FIGS. 5, 20, and 21, coupler 32 is connected to frame rest 22 using two bolts 34.

Also referring to FIGS. 15-19, coupler 26 includes an arm 36 which outwardly projects away from at least one ridge 32, arm 36 having a distal end. A locking pin 38 is disposed at the distal end of arm 36. Locking pin 38 perpendicularly projects outwardly in opposite directions from arm 36. Locking pin 38 is used for connecting connector 20 to the bicycle carrier 600 (refer to FIGS. 25 and 26). It is noted that when connector 20 is connected to frame member 502, arm 36 of coupler is perpendicular to frame member 502 (refer to FIG. 3).

Figure 27:
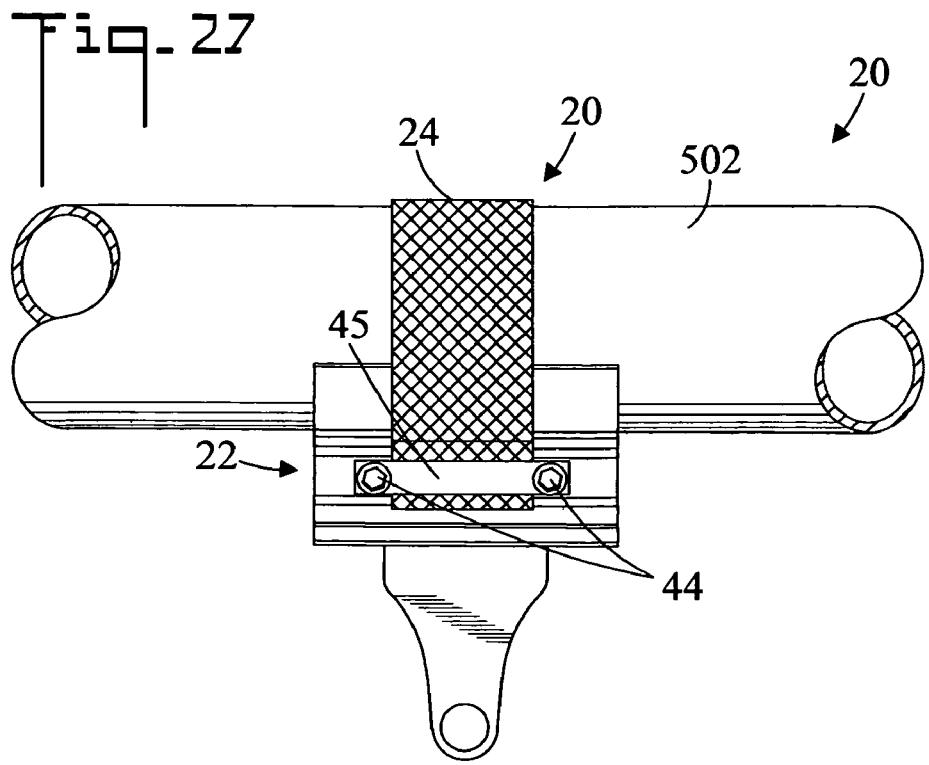
FIG. 27 is a side elevation view of a different embodiment of the line.

FIG. 6 is an enlarged cross sectional view of line 24. Line 24 has a soft cover 40 which will not mare frame member 502 of bicycle 500. In the shown embodiment soft cover 40 is a coating or jacket of a soft polymer (e.g. vinyl) or another soft material. Line 24 can include a cable having multiple wire strands 42, or alternatively can be a single elongated element such as a wire, carbon fiber, or ribbon. In the embodiment of FIGS. 2-5, it is noted that line 24 is wrapped a plurality of times (about 11) perpendicular to frame member 502. Screw clamps 44 are used to connect the ends of line 24 to frame rest 22 (refer to FIGS. 2-5). FIG. 27 discloses an alternate embodiment of line 24.

FIGS. 7-12 are top plan, side elevation, bottom plan, opposite side elevation, end elevation, and perspective views respectively of frame rest 22, showing body 27, grooves 28, and frame member receivers 30. Threaded holes 25 in frame rest 22 receive bolts 34 (refer to FIGS. 5, 20, and 21)

FIGS. 13 and 14 are end elevation views of frame rest 22 receiving another different shaped frame member 502 (oval rather than circular). Frame member receivers 30 each have a curved surface 46 for receiving frame member 502. Since frame member receivers 30 are pivotally connected to body 27, they are free to pivot and angularly conform to the surface of frame member 502. In FIG. 13 frame member receivers 30 have rotated outwardly to closely accept a wider frame member 502. Conversely, in FIG. 14 frame member receivers 30 have rotated inwardly to closely accept and more narrow frame member 502.

FIGS. 15 through 19 are top plan, side elevation, bottom plan, end elevation, and perspective views respectively of coupler 26, showing two ridges 32, arm 36, and locking pin 38. In FIGS. 15 and 17 it is noted that coupler 26 has clearance holes 29 and recess 31 for receiving bolts 34 (refer to FIGS. 5, 20, and 21).

FIGS. 20 and 21 are side elevation and end elevation views respectively of connector 20 being connected to frame member 502. Line 24 has been wrapped a plurality of times around frame member 502 and frame rest 22 so that line 24 extends across and partially covers at least one groove 28. Coupler 26 is positioned to be connected to frame rest 22 by bolts 34.

Figure 22:
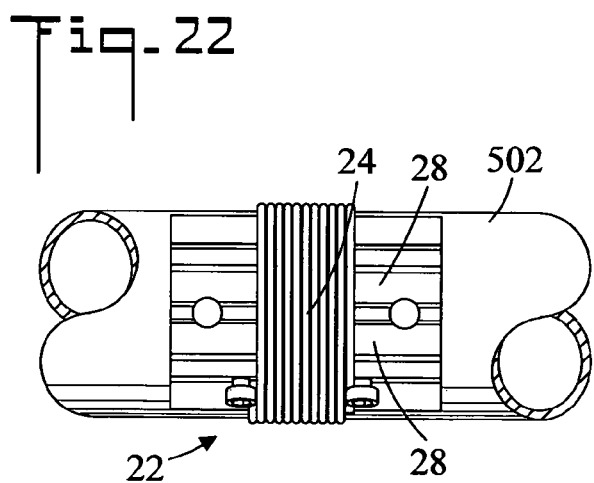
FIG. 22 is a bottom plan view of the frame rest connected to the frame member by the line.

FIG. 22 is a bottom plan view of frame rest 22 connected to frame member 502 by line 24 showing line 24 extending across grooves 28 (also refer to FIGS. 29-21).

FIG. 23 is an end elevation view of connector 20 connected to frame member 502. The tightening of bolts 34 causes coupler 26 to move toward frame rest 22, and the ridges 32 of coupler 26 to urge line 24 into grooves 28 of frame rest 22. This causes tension in line 24 and for line 24 to be pulled tight in directions 48 and thereby tighten around frame member 502 and frame rest 22. The tightening causes line 24 to exert an inward force (radial arrows) upon frame member 502 and frame rest 22 thereby holding frame member 502 and connector 20 firmly together.

FIG. 24 is an end elevation view of another embodiment of frame rest 22 and coupler 26. In this embodiment frame rest 22 has one groove 28 and coupler 26 has one ridge 32.

Figure 25:
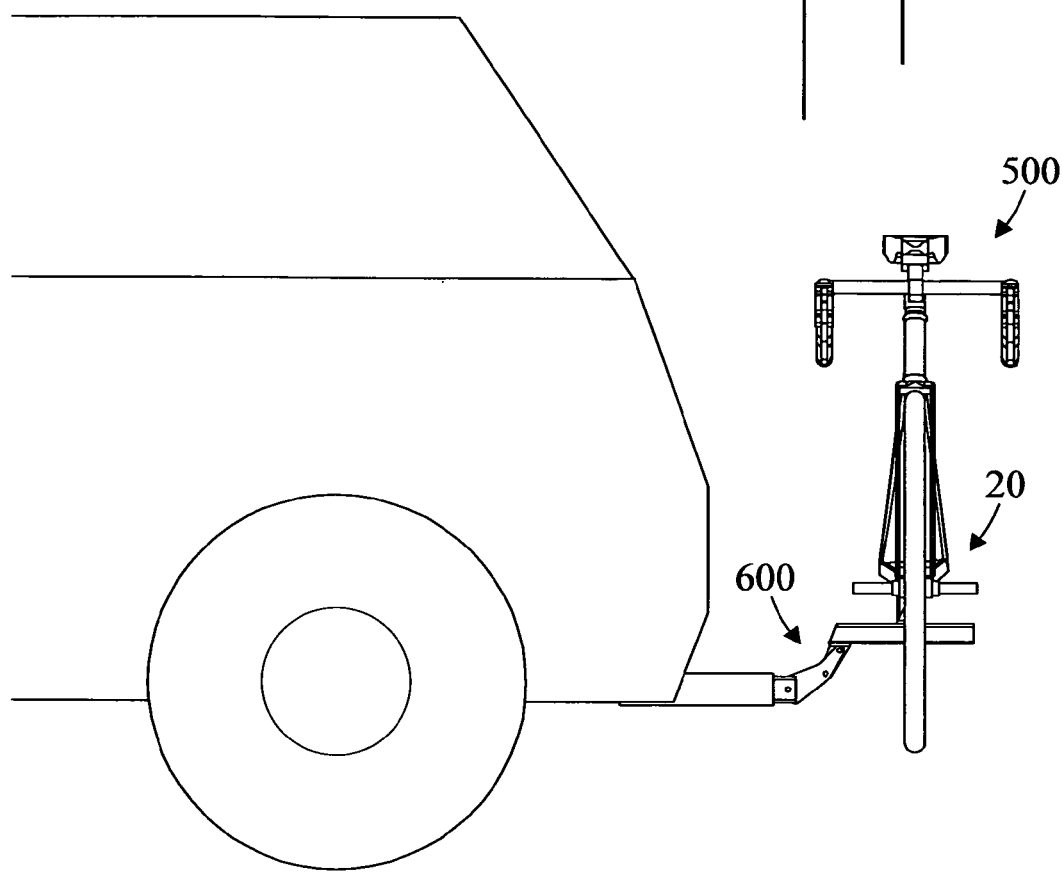
FIG. 25 is a reduced side elevation view of the connector and bicycle connected to a bicycle carrier.
Figure 26:
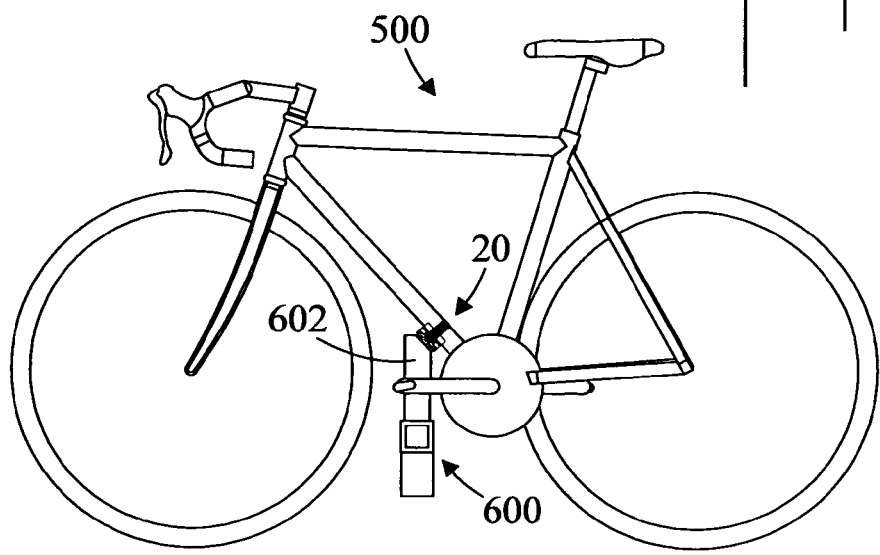
FIG. 26 is a reduce end elevation view of the connector and bicycle connected to the bicycle carrier.

FIGS. 25 and 26 are reduced side elevation and end elevation views respectively of connector 20 and bicycle 500 connected to bicycle carrier 600. As shown, bicycle carrier 600 is attached to a motor vehicle. Coupler 26 of connector 20 is received by a holder 602 on bicycle carrier 600 to hold connector 20 and attached bicycle 500 in place.

FIG. 27 is a side elevation view of a different embodiment of line 24. In this embodiment line 24 comprises a ribbon (such as of carbon fiber) which is wrapped at least once around frame rest 22 and frame member 502. A clamping member 45 secured by two screws 44 holds line 24 in place on frame rest 22.

Figure 28:
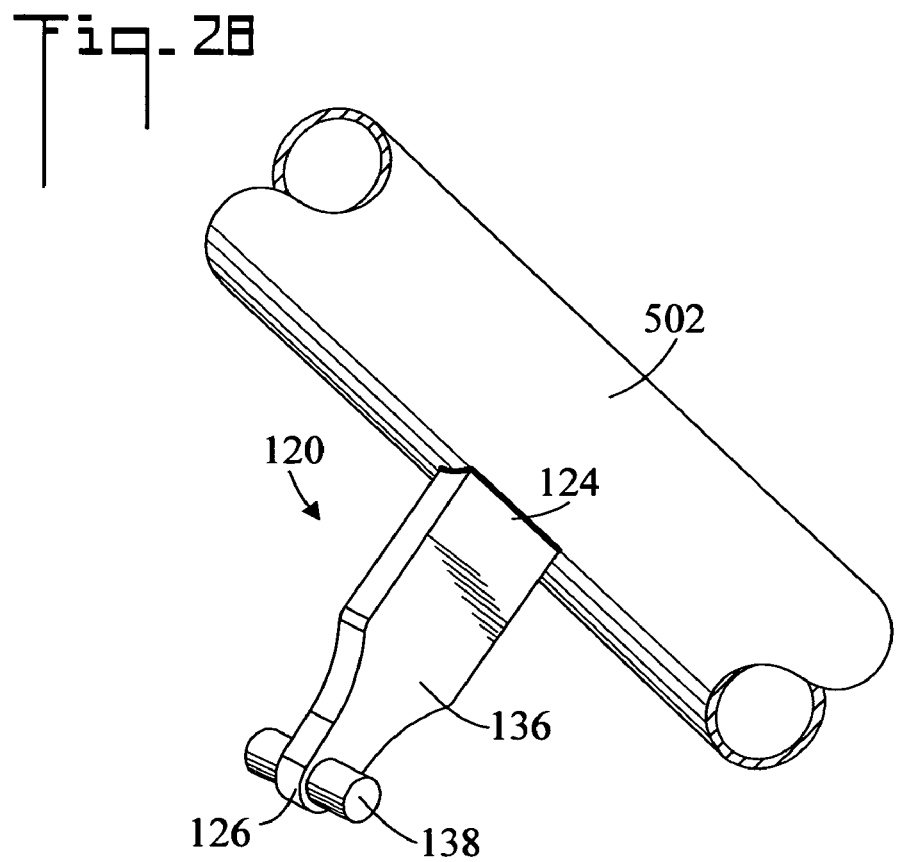
FIG. 28 is a perspective view of a second embodiment of the connector.

FIG. 28 is a perspective view of a second embodiment of the connector for connecting a bicycle having a frame member 502 to a bicycle carrier generally designated as 120. Connector 120 includes an arm 136 having a proximal end 124 and an opposite distal end 126.

Proximal end 124 is connected to the frame member of the bicycle. The connection can be effected by welding as shown, or by screws, clamps, or other mechanical means known in the art. A locking pin 138 is disposed at distal end 126 of arm 136. Locking pin 138 perpendicularly projecting outwardly in opposite directions from arm 136. Locking pin 138 is for connecting connector 120 to the bicycle carrier. In an embodiment, proximal end 124 of arm 136 is connected to the downtube of the bicycle, and perpendicularly projects therefrom.

In terms of use, method for attaching a connector 20 to a frame member 502 of a bicycle 500 includes: (refer to FIGS. 1-27)

(a) providing a bicycle 500 having a frame member 502;
(b) providing a connector 20 for connecting bicycle 500 to a bicycle carrier 600, connector 20 including;
  a frame rest 22 which is shaped and dimensioned to receive frame member 502 of bicycle 500;
  a line 24 which can be wrapped a plurality of times around frame rest 24 and frame member 502 of bicycle 500;
  a coupler 26 which connects to frame rest 22, wherein during the connection coupler 26 urges line 24 toward frame member 502 of bicycle 500 thereby tightening line 24 around frame rest 22 and frame member 502 of bicycle 500;
(c) positioning frame rest 22 so that it receives frame member 502 of bicycle 500;
(d) wrapping line 24 around frame rest 22 and frame member 502 of bicycle; and,
(e) connecting coupler 26 to frame rest 22, wherein coupler 26 urges line 24 toward frame member 502 of bicycle 500 thereby tightening line 24 around frame rest 22 and frame member 502 of bicycle 500.

The method further including:
in step (b), frame rest 22 having at least one groove 28;
in step (d), when line 24 is wrapped around frame rest 22, line 24 extends over at least one groove 28;
in step (b), coupler 26 having at least one ridge 32, wherein each at least one ridge 32 is shaped and dimensioned to be received by a corresponding at least one groove 28; and,
in step (e), when coupler 26 is connected to frame rest 22 the at least one ridge 32 urges line 24 into the at least one groove 28.

The method further including:
in step (b), frame rest 22 having two grooves 28, and coupler 26 having two ridges 32 which are received by two grooves 28 in step (e).

The method further including:
in step (b) frame rest 22 having a body 27 and two frame member receivers 30 which receive frame member 502 of bicycle 500;
in step (b), frame member receivers 30 each have a curved surface 46 for receiving frame member 502 of bicycle 500;
in step (b), two frame member receivers 30 pivotally connected to body 27; and,
in step (c), curved surfaces 46 of two frame member receivers 30 receiving frame member 30.

The method further including:
in step (b), line 24 having a length such that it can be wrapped a plurality of times around frame rest 24 and frame member 502; and,
in step (d), wrapping line 24 a plurality of times around frame rest 22 and frame member 502.

The method further including:
in step (b), line 24 having a soft cover which will not mare frame member 502 of bicycle 500 during step (e).

The method further including:
in step (b), coupler 26 having at least one ridge 32;
in step (b), coupler 26 including an arm 36 which outwardly projects away from at least one ridge 32, arm 36 having a distal end;
in step (b), a locking pin 38 disposed at the distal end of arm 36, locking pin 38 perpendicularly projecting outwardly in opposite directions from arm 36; and,
locking pin 36 for connecting connector 20 to bicycle carrier 60

The method further including:
in step (a), frame member 502 of bicycle 500 being a downtube;
in step (b), frame rest 22 shaped and dimensioned to receive the downtube of bicycle 500; and,
in step (c), positioning frame rest 22 so that it receives downtube of bicycle 500.

The method further including:
after step (e), permanently leaving connector 20 connected to frame member 502 of bicycle 500.

The possible embodiments of the connector and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the connector and method of use should be construed as limiting the invention to a particular embodiment or combination of embodiments. The scope of the invention is best defined by the appended claims.

I claim:

1. A connector for a bicycle having a frame member, said connector comprising:
  a frame rest which is shaped and dimensioned to receive the frame member of the bicycle;
  a line which can be wrapped around said frame rest and the frame member of the bicycle;
  a coupler which connects to said frame rest, wherein when said coupler is connected to said frame rest, said coupler urges said line toward the frame member of the bicycle thereby tightening said line around said frame rest and the frame member of the bicycle;
  said frame rest having at least one groove;
  when said line is wrapped around said frame rest and the frame member, said line extends across said at least one groove;
  said coupler having at least one ridge, wherein each said at least one ridge is shaped and dimensioned to be received by a corresponding said at least one groove; and,
  so that when said coupler is connected to said frame rest said at least one ridge urges said line into said at least one groove.

2. The connector according to claim 1, further including:
  said frame rest having two grooves, and said coupler having two ridges which are received by said two grooves.

3. A connector for a bicycle having a frame member, said connector comprising:
  a frame rest which is shaped and dimensioned to receive the frame member of the bicycle;
  a line which can be wrapped around said frame rest and the frame member of the bicycle;
  a coupler which connects to said frame rest, wherein when said coupler is connected to said frame rest, said coupler urges said line toward the frame member of the bicycle thereby tightening said line around said frame rest and the frame member of the bicycle;
  said frame rest having a body and two frame member receivers which receive the frame member of the bicycle;

said two frame member receivers each having a curved surface for receiving the frame member of the bicycle; and, said two frame member receivers pivotally connected to said body.

4. A connector for a bicycle having a frame member, the frame member being a downtube, said connector comprising:

a frame rest which is shaped and dimensioned to receive the frame member of the bicycle;

a line which can be wrapped around said frame rest and the frame member of the bicycle;

a coupler which connects to said frame rest, wherein when said coupler is connected to said frame rest, said coupler urges said line toward the frame member of the bicycle thereby tightening said line around said frame rest and the frame member of the bicycle;

said frame rest having at least one groove;

when said line is wrapped around said frame rest and the frame member, said line extends across said at least one groove;

said coupler having at least one ridge, wherein each said at least one ridge is shaped and dimensioned to be received by a corresponding said at least one groove;

so that when said coupler is connected to said frame rest said at least one ridge urges said line into said at least one groove;

said frame rest having a body and two frame member receivers which receive the frame member of the bicycle;

said two frame member receivers each having a curved surface for receiving the frame member of the bicycle;

said two frame member receivers pivotally connected to said body;

said line having a soft cover;

said coupler including an arm which outwardly projects away from said at least one ridge, said arm having a distal end; and, said frame rest shaped and dimensioned to receive the downtube of the bicycle.

* * * * *